United States Patent
Zhang et al.

(10) Patent No.: US 11,167,729 B2
(45) Date of Patent: Nov. 9, 2021

(54) WIPER BLADE AND WIPER

(71) Applicant: Taixiang Vehicle Replace Parts (Shenzhen) Co. Ltd., Shenzhen (CN)

(72) Inventors: Charles Zhang, Guangdong (CN); Xianfeng Wang, Guangdong (CN)

(73) Assignee: Taixiang Vehicle Replace Parts (Shenzhen) Co. Ltd., Shenzhen (CN)

( * ) Notice: Subject to any disclaimer, the term of this patent is extended or adjusted under 35 U.S.C. 154(b) by 133 days.

(21) Appl. No.: 16/820,939

(22) Filed: Mar. 17, 2020

(65) Prior Publication Data

US 2020/0298803 A1    Sep. 24, 2020

(30) Foreign Application Priority Data

Mar. 19, 2019    (CN) .......................... 201910207772.5

(51) Int. Cl.
*B60S 1/38*    (2006.01)
*B60S 1/40*    (2006.01)

(52) U.S. Cl.
CPC ........... *B60S 1/3849* (2013.01); *B60S 1/3867* (2013.01); *B60S 1/40* (2013.01); *B60S 1/4083* (2013.01)

(58) Field of Classification Search
CPC .... B60S 1/3849; B60S 1/3865; B60S 1/3867; B60S 1/3868; B60S 1/387; B60S 1/40; B60S 1/4003; B60S 1/4083

USPC ....................................................... 15/250.32
See application file for complete search history.

(56) References Cited

U.S. PATENT DOCUMENTS

| 2010/0154159 A1* | 6/2010 | Baque ................... B60S 1/3849 15/250.32 |
| 2016/0144830 A1* | 5/2016 | Coos .................... B60S 1/3484 15/250.23 |

* cited by examiner

*Primary Examiner* — Gary K. Graham
(74) *Attorney, Agent, or Firm* — Michael Best & Friedrich LLP

(57) ABSTRACT

A wiper blade and a wiper. The wiper blade comprises a wiping strip and a connection structure, the connection structure comprising: an adapter fixed to the wiping strip, the adapter comprising a first side part and a second side part which are opposite each other, with a first surface and a second surface being disposed on the first side part and the second side part respectively; a connector, the interior of the connector having an opening, a foolproofing part facing the second surface, and a hole in communication with the opening; when the connector is fitted to the adapter in an opposite direction, the first surface obstructs the foolproofing part and the shaft cannot be hinged into the hole via the opening. The foolproofing part can prevent a wiper arm from being fitted to the wiper blade incorrectly.

18 Claims, 3 Drawing Sheets

WIPER BLADE AND WIPER

BACKGROUND OF THE INVENTION

The present application relates to a wiper blade and a wiper comprising the wiper blade.

A wiper for a vehicle clears rainwater, snow, fallen leaves and deposits, etc. from the windscreen, the rear window glass or, in some models of vehicle, the headlights. In the wiper, an electric motor drives a connecting rod mechanism, and a wiper arm drives a wiper blade to reciprocate in contact with the glass surface.

The wiper arm is removably connected to the wiper blade. Once the wiper arm and the wiper blade have been fitted together, the wiper blade can rotate relative to the wiper arm within a small angular range, enabling adjustment of the wiper blade to fit the glass surface as the wiper arm swings. Furthermore, the fitting direction of the wiper arm relative to the wiper blade is fixed, and once the two parts have been fitted together, two wiping sides on the wiper blade are asymmetrical with respect to the wiper arm; if fitting is performed the wrong way round, the length of one wiper blade wiping side is shortened, and this will affect the effective wiping area and in turn affect the quality and performance of the wiper. Generally, the fitting direction is marked on the product, but incorrect fitting is still unavoidable, thus mistakes occur on production lines, and must be corrected promptly, reducing the production efficiency; if a mistake occurs when a consumer is replacing a wiper blade, the consumer might not discover the mistake in the first instance.

SUMMARY OF THE INVENTION

At least one problem to be solved by the present application is the provision of a wiper blade, which is fitted to a wiper arm in a predetermined direction.

The wiper blade to which the present application relates comprises: a wiping strip and a connection structure, wherein the connection structure comprises: an adapter fixed to the wiping strip, the adapter comprising a shaft, and a first side part and a second side part which are opposite each other and support the shaft, with a first surface and a second surface being disposed on the first side part and the second side part respectively; a connector, the interior of the connector having an opening, a foolproofing part facing the second surface, and a hole in communication with the opening; when the connector is fitted to the adapter in a predetermined direction, the shaft is hinged into the hole via the opening and the foolproofing part is located above the second surface in a contactless fashion; when the connector is fitted to the adapter in an opposite direction, the first surface obstructs the foolproofing part and the shaft cannot be hinged into the hole via the opening.

In some embodiments, the connector has an elongated shape extending in a longitudinal direction, and the hole is offset from the opening in the longitudinal direction.

In some embodiments, the opening extends downward substantially perpendicular to the longitudinal direction, and once the shaft has been hinged into the hole, at least a part of a peripheral wall of the hole is located below the shaft.

In some embodiments, the second surface is provided with a recess, and once the shaft has been hinged into the hole, the foolproofing part is located in the recess, and the foolproofing part is disposed above the opening.

In some embodiments, the foolproofing part is a projection extending from an interior sidewall of the connector.

In some embodiments, narrow slots receiving the first side part and the second side part are disposed in the interior of the connector, and the projection bridges inner walls of one of the narrow slots.

In some embodiments, the first surface has a different shape from that of the second surface; when the connector is fitted to the adapter in the predetermined direction, the position of the foolproofing part corresponds to a position of minimum radial size of the second surface relative to the shaft; when the connector is fitted to the adapter in the opposite direction, the position of the foolproofing part corresponds to a position of maximum height of the first surface.

In some embodiments, when the connector is fitted to the adapter in the opposite direction, the foolproofing part is obstructed by a top inflection point of the first surface, the top inflection point being located above the shaft.

In some embodiments, the connector is manufactured by molding, and a hole wall of the hole has a process cavity thereabove to facilitate mold separation.

In some embodiments, the adapter is a metal member, and the connector is a plastic member.

Another aspect to which the present application relates is the provision of a wiper, comprising a wiper arm and the wiper blade as described above, the connector being provided with a socket that is open in the longitudinal direction, and the wiper arm being fixed to the connector via the socket.

Here, the "opposite direction" is a direction that is reversed with respect to the predetermined direction. The longitudinal direction is a direction of extension of the wiper arm. The longitudinal direction may be the same as the predetermined direction.

A guide part of the connector guides the shaft of the adapter into the guide part, and the connector can engage with the adapter in the predetermined direction or the opposite direction. The present application provides a new structure for connecting the wiper arm and wiper blade; the structure ensures that the wiper arm and wiper blade are connected in the correct manner of fitting. If a worker or consumer performs fitting in the opposite direction, the position of the foolproofing part relative to the adapter changes, and the connector cannot engage with the adapter due to the obstruction caused by the foolproofing part; it is thus ensured that the wiper arm is always fitted to the wiper blade in the correct, predetermined manner, so the assembly efficiency and convenience are improved, and the wiper is enabled to achieve the normal level of performance. The present application may be obtained by making a slight alteration to an existing connector.

BRIEF DESCRIPTION OF THE DRAWINGS

Through the following detailed explanation with reference to the accompanying drawings, other aspects and features of the present application will become obvious. However, it should be known that the drawings are designed purely for explanatory purposes, and do not limit the scope of the present application; this is because it should refer to the attached claims. It should also be known that the drawings are merely intended to conceptually illustrate the structures and procedures described here; unless otherwise specified, the drawings need not be drawn to scale.

A fuller understanding of the present application will be gained by reading the detailed explanation of particular embodiments below in conjunction with the drawings; identical reference labels in the drawings always denote identical elements in the drawings. Here.

DETAILED DESCRIPTION

To help those skilled in the art to gain a precise understanding of the subject matter for which protection is claimed in the present application, particular embodiments of the present application are described in detail below in conjunction with the accompanying drawings.

Figure 1:
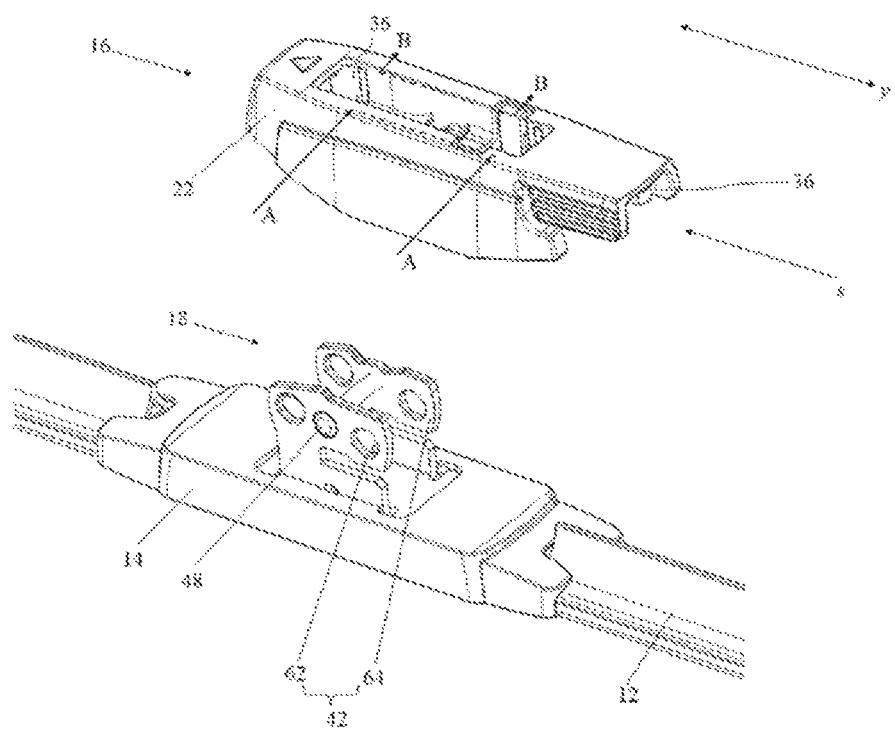
FIG. 1 is a schematic drawing of an embodiment of the wiper to which the present application relates.

Referring to FIG. 1, the wiper to which the present application relates comprises a wiper arm (not shown), a wiping strip 12, and a connection structure connected between the wiper arm and the wiping strip 12. The connection structure comprises a connector 16 and an adapter 18, wherein the wiper arm is attached to the connector 16. In the embodiment shown, the connector is made of plastic, and comprises an elongated body 22 in a longitudinal direction; a long and narrow socket 36 is provided above the body 22, the socket 36 being in communication with the surroundings at one side in the longitudinal direction y; the wiper arm is passed into the socket 36 in the arrow direction s shown in the figure, and is then joined to the connector 16 by a fixing method which those skilled in the art could envisage. The adapter 18 is made of metal, being manufactured and fixed to a supporting seat 14 of a framework structure, and the wiping strip 12 is inserted in the bottom of the supporting seat 14 in a certain manner.

Figure 2:
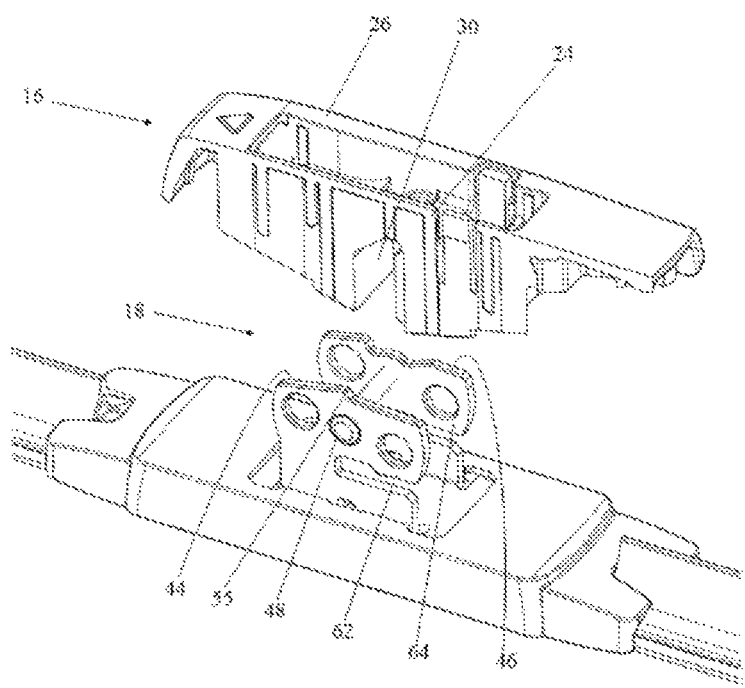
FIG. 2 is a sectional view along line A-A in FIG. 1.
Figure 3:
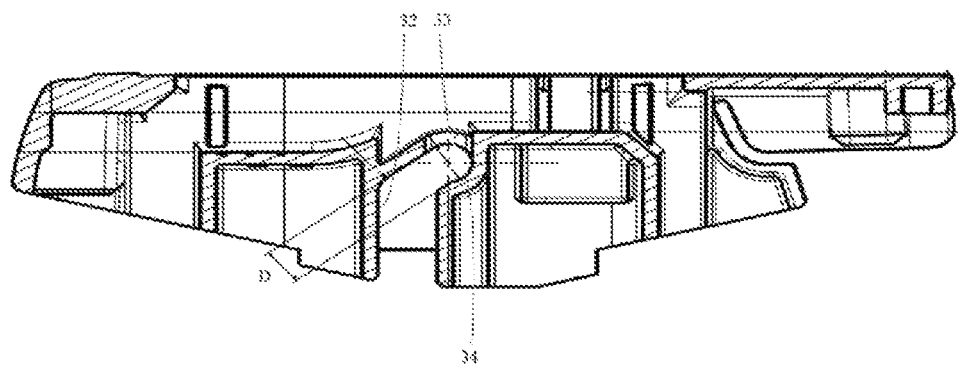
FIG. 3 is a schematic drawing of an embodiment of the guide part of the connector to which the present application relates.

The adapter 18 comprises a support 42 and a shaft 48 supported by the support 42. In the embodiment shown, the support 42 comprises a first side part 62 and a second side part 64 which are opposite each other, with the shaft 48 being supported between the two side parts 62, 64. When the connector 16 and the adapter 18 have been fitted together, the body 22 of the connector 16 covers the support 42. For clarity of explanation, FIG. 2 shows the internal structure of the connector after being cut open. A guide part 30, open toward the bottom, is disposed in the interior of the connector 16; the connector 16 "hangs" itself on the shaft 48 of the adapter 18 via the guide part 30, such that the connector 16 can rotate and swing around the shaft 48 through a small angle relative to the adapter 18. The connector 16 may be hung on the shaft in the direction shown, this direction being a predetermined direction, or may be hung on the shaft in a direction opposite the direction shown. FIG. 3 shows a schematic view of an embodiment of the guide part. The guide part comprises an opening 32 and a hole 34 in communication with the opening 32; the opening 32 is in the form of a channel extending downward substantially perpendicular to the longitudinal direction; the opening 32 and the hole 34 are offset in a predetermined direction of fitting; the opening 32 guides the connector to move along the opening 32 relative to the adapter and enter the offset hole 34 to perform assembly. The diameter of the hole 34 may be designed such that the shaft can enter the hole 34 and can perform relative rotation to a small extent in the hole 34, and a junction size D of the hole 34 and the opening 32 is designed such that the shaft cannot easily disengage from the hole 34. After the shaft 48 has entered the hole 34, at least a part of a peripheral wall of the hole 34 is located below the shaft 48. It can be seen from the figure that a process cavity 33 is also provided above the hole 34. The connector is formed by molding; a mold comprises an upper part and a lower part. Due to the offset design of the opening 32 and the hole 34, a core block must be disposed in the mold. The design of the process cavity 33 replaces the core block, to facilitate mold opening.

Figure 4:
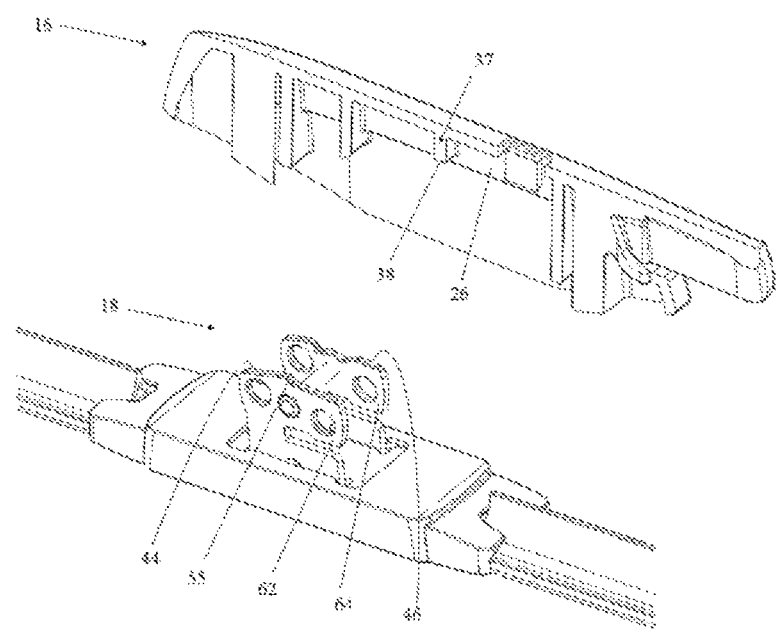
FIG. 4 is a sectional view along line B-B in FIG. 1.

Referring to FIG. 4, a foolproofing part 37 is disposed in the interior of the connector 16; in the embodiment shown, the foolproofing part 37 is a projection 38, which extends from an interior sidewall 26 of the connector 16 and faces the support 42. Two narrow slots, corresponding to the first side part 62 and the second side part 64, may be disposed in the interior of the connector, in order to receive the first side part 62 and the second side part 64 when the connector and the adapter are fitted together. The projection 38 may be formed so as to bridge two sidewalls of the narrow slot, and can thereby enhance the strength of the narrow slot. A first surface 44 and a second surface 46 are disposed on the first side part 62 and the second side part 64 respectively. The foolproofing part 37 faces the second surface 46. Corresponding to the foolproofing part 37, an interference part 55 is provided on the first surface 44. In the case where fitting is carried out normally, the shaft 48 is hinged into the hole 34 via the opening 32, and the foolproofing part 37 is located above the second surface 46 in a contactless fashion. The connector 16 can thus be fitted to the adapter 18 smoothly. However, when the connector 16 is fitted to the adapter 18 in the opposite direction, i.e. the connector 16 is engaged with the adapter 18 in a direction turned through 180° in the longitudinal direction, in this case the foolproofing part 37 is on the same side as the interference part 55, and the first surface obstructs the foolproofing part 37, thereby preventing the connector 16 from continuing to be fitted, with the shaft being unable to be hinged into the hole 34 via the opening 32.

The positions of the foolproofing part 37 and the interference part 55 not only correspond in the longitudinal direction, but are also on two surfaces respectively, thereby ensuring that the two parts do not interfere in the correct longitudinal fitting direction, but interfere in the opposite fitting direction.

The heights of the first surface 44 and the second surface 46 may be taken into account when determining the position of the foolproofing part 37 in the longitudinal direction. If the foolproofing part 37 is configured to correspond to a position of maximum height of the first surface 44, then compared with a situation in which the foolproofing part 37 is configured to correspond to a lower position of the two surfaces, the foolproofing part 37 in the embodiment shown will be obstructed by the interference part 55 earlier when fitting in the opposite direction takes place, and the mistake will thus be discovered promptly. The position of the foolproofing part 37 may also correspond to a position of minimum radial size of the second surface 46 relative to the shaft 48.

Figure 5:
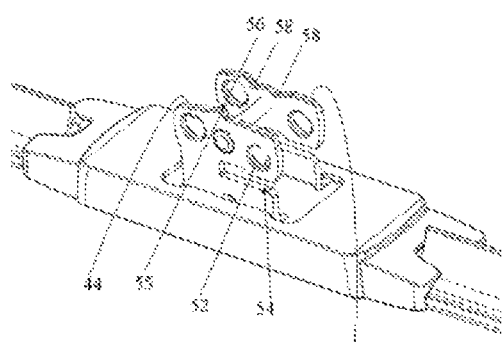
FIG. 5 is a schematic drawing of an embodiment of the adapter to which the present application relates.

The first surface 44 may be designed to have a different surface shape from that of the second surface 46; this is of assistance when selecting the position of the foolproofing part, i.e. the highest point or point of minimum radial size is found before determining the position of the foolproofing part. As shown in FIG. 5, the first surface 44 has a top inflection point 56, and the interference part 55 is formed as a protruding edge at the position of the top inflection point 56. The top inflection point 56 may also be located above the shaft 48. The second surface 46 is substantially W-shaped, having two bottom inflection points 58. A recess of lower height is present between the two bottom inflection points 58; once the shaft 48 has been hinged into the hole 34, the foolproofing part 37 is located in the recess. The interference part 55 may be determined according to the circumstances of the first surface 44 and the second surface 46 themselves. After selecting the position of the interference part 55, the position and structure of the corresponding foolproofing part 37 on the connector 16 can be correspondingly designed.

The foolproofing part 37 may also be disposed above the hole 34 of the guide part, or the interference part 55 is disposed above the hole 34 of the guide part, see FIG. 2. When fitting is carried out in the opposite direction, the shaft cannot enter the hole 34 from the opening 32.

Figure 6:
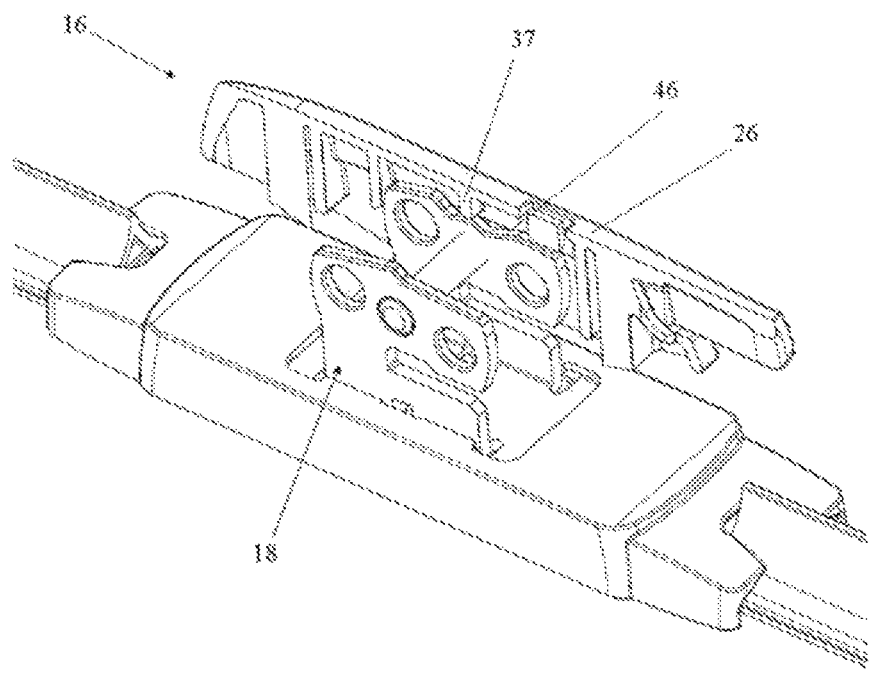
FIG. 6 is a schematic drawing of a state in which the connector is fitted to the adapter in a predetermined direction.
Figure 7:
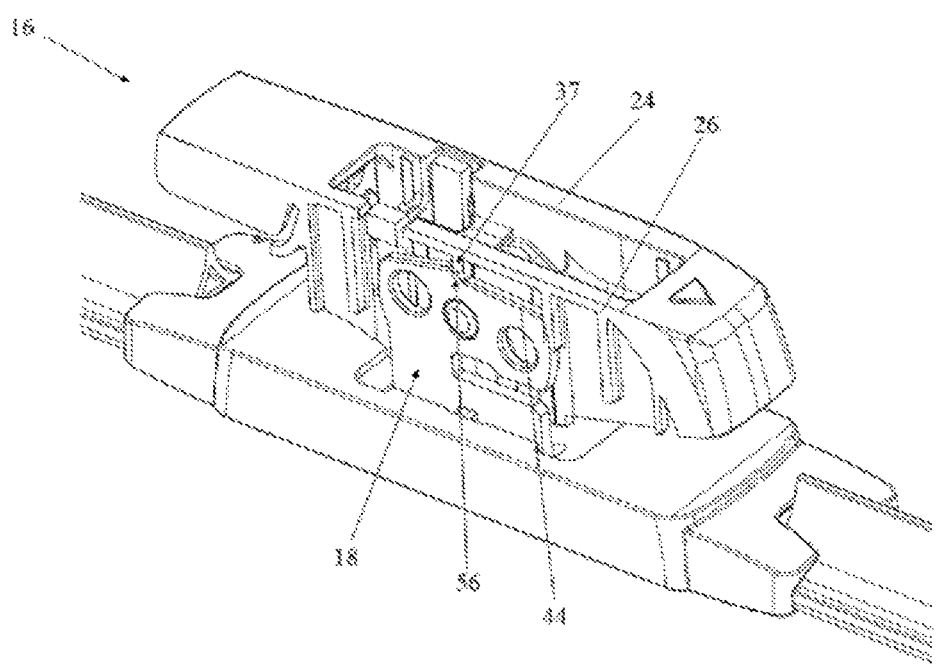
FIG. 7 is a schematic drawing of a state in which the connector is fitted to the adapter in an opposite direction.

FIG. 6 shows the connector 16 fitted to the adapter 18 in a set direction. After fitting, the foolproofing part 37 is above the second surface 46 of the adapter 18, with no interference therebetween; this is the normal situation. FIG. 7 shows the connector 16 fitted to the adapter 18 in the opposite direction. As can been seen from the figure, the foolproofing part 37 precisely faces the top inflection point 56, i.e. the interference part, on the first surface 44 of the adapter 18; as the connector 16 approaches the adapter 18 in a downward direction, the foolproofing part 37 strikes the interference part, and the connector 16 is thereby prevented from continuing to move downward. Assembly fails.

It is well known in the art that depending on the vehicle model, more than one type of wiper arm is possible, and the wiper arm and wiper blade may be fitted together in more than one way; thus, the connection structure responsible for connecting the wiper arm and the wiping strip may have many design forms. When a general-purpose adapter is used, since the adapter is provided with multiple features satisfying different forms of assembly, such as a hole 52 or slot 54 shown in FIG. 5, one type of adapter may be suitable for connecting to more than one type of wiper arm. According to the concept of the present application, it is possible to merely add the foolproofing part to the connector, without any need to alter the adapter. Not only is it ensured that the wiper arm and wiper blade are fitted together correctly, but the machining of components is facilitated, reducing the number of process steps and in turn reducing costs. Alternatively, according to the concept of the present application, both the connector and the adapter may be altered. The foolproofing part may be integrally formed with the connector, or formed as a part of the connector by secondary forming. The interference part may be a part of the support itself of the adapter, or may be an added structure. Furthermore, it is known from the description above that the structure of the adapter need not be limited to that in the embodiments shown.

Although particular embodiments of the present application have been shown and described in detail in order to explain the principles of the present application, it should be understood that the present application may be implemented in other ways without departing from such principles.

The invention claimed is:

1. A wiper blade, comprising a wiping strip and a connection structure, wherein the connection structure comprises:

an adapter (18) fixed to the wiping strip, the adapter (18) comprising a shaft (48), and a first side part (62) and a second side part (64) which are opposite each other and support the shaft, with a first surface (44) and a second surface (46) being disposed on the first side part and the second side part respectively; and a connector (16) having an interior, the interior of the connector having an opening (32), a foolproofing part (37) facing the second surface (46), and a hole (34) in communication with the opening; wherein when the connector is fitted to the adapter in a predetermined direction, the shaft is hinged into the hole (34) via the opening (32) and the foolproofing part (37) is located above the second surface (46) in a contactless fashion; and wherein when the connector is fitted to the adapter in an opposite direction, the first surface obstructs the foolproofing part (37) and the shaft cannot be hinged into the hole (34) via the opening (32).

2. The wiper blade as claimed in claim 1, wherein the connector (16) has an elongated shape extending in a longitudinal direction, and the hole (34) is offset from the opening (32) in the longitudinal direction.

3. The wiper blade as claimed in claim 2, wherein the opening extends downward substantially perpendicular to the longitudinal direction, and once the shaft has been hinged into the hole (34), at least a part of a peripheral wall of the hole (34) is located below the shaft.

4. The wiper blade as claimed in claim 2, wherein the second surface (46) is provided with a recess, and once the shaft has been hinged into the hole (34), the foolproofing part (37) is located in the recess, and the foolproofing part (37) is disposed above the opening.

5. The wiper blade as claimed in claim 2, wherein the connector is manufactured by molding, and a hole wall of the hole (34) has a process cavity thereabove to facilitate mold separation.

6. The wiper blade as claimed in claim 1, wherein the foolproofing part (37) is a projection (38) extending from an interior sidewall of the connector.

7. The wiper blade as claimed in claim 6, wherein narrow slots receiving the first side part and the second side part are disposed in the interior of the connector, and the projection bridges inner walls of one of the narrow slots.

8. The wiper blade as claimed in claim 1, wherein the first surface has a different shape from that of the second surface; wherein when the connector is fitted to the adapter in the predetermined direction, the position of the foolproofing part (37) corresponds to a position of minimum radial size of the second surface relative to the shaft; and wherein when the connector is fitted to the adapter in the opposite direction, the position of the foolproofing part (37) corresponds to a position of maximum height of the first surface.

9. The wiper blade as claimed in claim 1, wherein when the connector is fitted to the adapter in the opposite direction, the foolproofing part (37) is obstructed by a top inflection point (56) of the first surface, the top inflection point (56) being located above the shaft.

10. A wiper, comprising a wiper arm and the wiper blade as claimed in claim 1, the connector being provided with a socket (36) that is open in the longitudinal direction, and the wiper arm being fixed to the connector via the socket.

11. The wiper as claimed in claim 10, wherein the connector (16) has an elongated shape extending in a longitudinal direction, and the hole (34) is offset from the opening (32) in the longitudinal direction.

12. The wiper as claimed in claim 11, wherein the opening extends downward substantially perpendicular to the longitudinal direction, and once the shaft has been hinged into the hole (34), at least a part of a peripheral wall of the hole (34) is located below the shaft.

13. The wiper as claimed in claim 11, wherein the connector is manufactured by molding, and a hole wall of the hole (34) has a process cavity thereabove to facilitate mold separation.

14. The wiper as claimed in claim 10, wherein the second surface (46) is provided with a recess, and once the shaft has been hinged into the hole (34), the foolproofing part (37) is located in the recess, and the foolproofing part (37) is disposed above the opening.

15. The wiper as claimed in claim 14, wherein the foolproofing part (37) is a projection (38) extending from an interior sidewall of the connector.

16. The wiper as claimed in claim 14, wherein narrow slots receiving the first side part and the second side part are disposed in the interior of the connector, and the projection bridges inner walls of one of the narrow slots.

17. The wiper as claimed in claim 10, wherein the first surface has a different shape from that of the second surface; wherein when the connector is fitted to the adapter in the predetermined direction, the position of the foolproofing part (37) corresponds to a position of minimum radial size of the second surface relative to the shaft; and wherein when the connector is fitted to the adapter in the opposite direction, the position of the foolproofing part (37) corresponds to a position of maximum height of the first surface.

18. The wiper as claimed in claim 10, wherein when the connector is fitted to the adapter in the opposite direction, the foolproofing part (37) is obstructed by a top inflection point (56) of the first surface, the top inflection point (56) being located above the shaft.

* * * * *